United States Patent [19]

Rives

[11] Patent Number: 4,895,215

[45] Date of Patent: Jan. 23, 1990

[54] SEAL CAGE ASSEMBLY FOR RELATIVELY MOVABLE MEMBERS

[76] Inventor: Allen K. Rives, 12211 Carols Way Cir., Houston, Tex. 77070

[21] Appl. No.: 279,998

[22] Filed: Dec. 5, 1988

[51] Int. Cl.$^4$ .................. E21B 10/22; F16C 19/00
[52] U.S. Cl. .................... 175/371; 175/359; 277/35; 384/94; 384/470; 384/477; 384/572
[58] Field of Search .............. 175/371, 372, 356, 357, 175/358, 359, 227, 228; 384/92, 93, 94, 95, 130, 470, 477, 523, 550, 572; 277/35, 39, 123, 124, 125

[56] References Cited

U.S. PATENT DOCUMENTS

| | | |
|---|---|---|
| 1,905,066 | 4/1933 | Scott . |
| 3,192,942 | 7/1965 | Manor et al. .................. 277/35 |
| 3,244,459 | 4/1966 | Ortloff .................. 308/8.2 |
| 3,251,634 | 5/1966 | Dareing .................. 308/8.2 |
| 3,362,762 | 1/1968 | Haller .................. 384/572 |
| 3,601,456 | 8/1971 | Becker .................. 308/8.2 |
| 3,628,838 | 12/1971 | Camosso et al. .................. 384/477 |
| 3,918,778 | 11/1975 | Jacobson et al. .................. 308/201 |
| 3,995,367 | 12/1976 | Penny .................. 308/8.2 |
| 4,098,358 | 7/1978 | Klima .................. 175/65 |
| 4,172,502 | 10/1979 | van Nederveen .................. 175/369 |
| 4,258,806 | 3/1981 | Kunkel et al. .................. 175/370 |
| 4,290,497 | 9/1981 | Barnetche .................. 175/371 |
| 4,386,663 | 6/1983 | Ippolito .................. 384/94 |
| 4,446,933 | 5/1984 | Bodine .................. 175/229 |
| 4,533,003 | 8/1985 | Bailey et al. .................. 384/95 |
| 4,600,064 | 7/1986 | Scales et al. .................. 175/368 |
| 4,618,271 | 10/1986 | Li .................. 384/461 |
| 4,629,338 | 12/1986 | Ippolito .................. 175/371 |

FOREIGN PATENT DOCUMENTS 2112785 11/1971 Fed. Rep. of Germany .
2409585 9/1974 Fed. Rep. of Germany .
200538 10/1967 U.S.S.R. .

Primary Examiner—Hoang C. Dang
Assistant Examiner—Terry Lee Melius
Attorney, Agent, or Firm—Jack W. Hayden

[57] ABSTRACT

A rotatable seal cage assembly for positioning between relatively movable members including a ring with inner and outer circumferential edges, which edges are joined by two flat side surfaces extending therebetween. An annular projecting surface extends from one of the ring side surfaces. A projection extends from the other side surface of the ring to be engaged by rotatable bearings to rotate the ring when relative rotation of the members occurs. Radially spaced seals are provided on each side of the annular projecting surface to seal between the rotatable seal cage assembly and each of the relatively movable members and inhibit damage to the radially spaced seals between the relatively movable members.

22 Claims, 1 Drawing Sheet

SEAL CAGE ASSEMBLY FOR RELATIVELY MOVABLE MEMBERS

CROSS REFERENCE TO PENDING APPLICATION

The present invention relates to my co-pending application "Arrangement For Reducing Seal Damage Between Rotatable And Stationary Members" filed on Aug. 24, 1987 and bearing SEr. No. 07/111,794, now U.S. Pat. No. 4,825,964.

STATEMENT OF THE PRIOR ART

The use of cage assemblies between relatively movable members, such as relative rotating members is well known. Where a rotatable member rotates about a stationary member with seal means therebetween, or where two rotatable members rotate at different relative rates of rotation or relative speeds with seal means therebetween, the deterioration rate of the seal means between the relatively movable means increases particularly as the differential rate of rotation between the rotatable members increases.

The problem is further aggravated where the relatively movable members are employed at substantially inaccessible locations such as in earth boring operations where cutters are provided on a spindle for drilling a well bore or other type opening in the earth's surface. The remote location of the cutter member relative to the earth's surface causes substantial expense and loss of time when the sealing arrangement between the relatively movable members must be replaced because of wear.

SUMMARY OF THE INVENTION

The present invention provides a relatively simple device for supporting seals between relatively movable, or rotatable members, while inhibiting seal damage to the seals.

Other objects and advantages of the present invention will become more readily apparent from a consideration of the following drawing and description.

DESCRIPTION OF THE PREFERRED EMBODIMENTS

The present invention is illustrated and will be described in connection with its use between a rotatable member such as a rotatable cutter in a drill bit, and the stationary spindle on which the cutter is arranged. However, such illustration is by way of example only, as the present invention may be employed in any situation such as between relative movable or rotatable members where one member is stationary and the other member moves relative thereto, or between members which both rotate but at different rate of rotation.

It is to be understood that the following description is by way of example or illustration only and the present invention can be employed in any situation where it is desired to reduce damage to a sealing relationship between relatively movable members.

Figure 1:
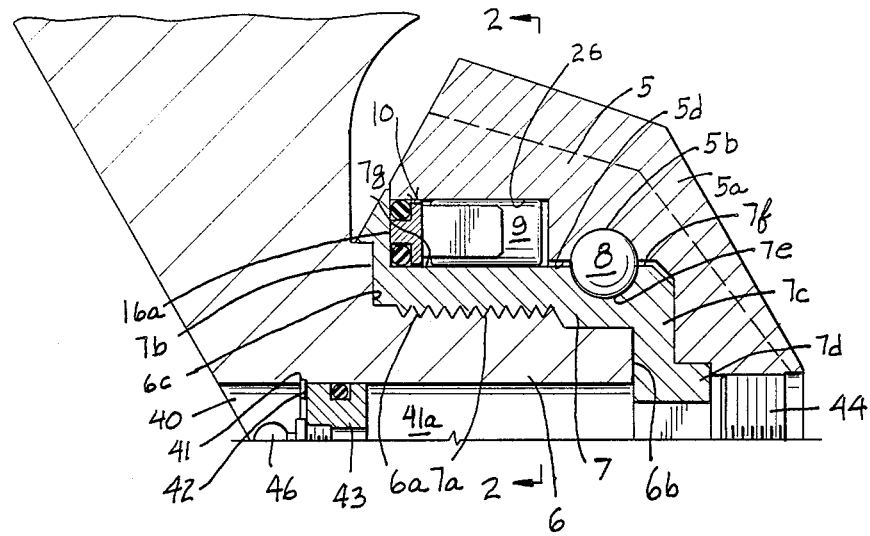
FIG. 1 is a partial sectional view illustrating a rotatable member, received on another member with the present invention interposed therebetween.

A cutter means or bit cone is represented at 5 in FIG. 1 having suitable cutter elements or teeth 5a thereon. A drill bit for well bores includes a drill bit body generally with a plurality of shanks or extensions thereon with a spindle 6 extending from each shank for receiving and supporting a bit cone 5 as well known in the art. It can be appreciated that the exact form and arrangement of the members in which the invention herein may be employed will vary.

In FIG. 1 the bit shank is not shown and rotates with the bit body, but the spindle 6 does not rotate relative to the bit cone or cutter 5. Any suitable number of shanks and corresponding spindles supported thereon may be provided for a drill bit and a cutter 5 will be provided for each spindle 6.

The spindle 6 is normally integral with or otherwise affixed to the shank. It can also be appreciated that the exact configuration and arrangement of the cutter 5 on the shank may vary from drill bit to drill bit. However, the relationship and arrangement of one member to another member in which the present invention may be employed will vary depending upon whether both members are rotating and at different speeds and whether one member is a stationary member such as the spindle 6 described herein in relation to a drill bit and the other member is rotating relative thereto such as the cutter 5.

In the form of the invention shown it will be noted that the spindle 6 is provided with suitable threads 6a for receiving the sleeve member 7 thereon which has internal threads 7a. The sleeve member 7 includes a radial inwardly extending end portion 7c and a portion 7d which extends longitudinally from the reduced diameter portion 7c which abuts the end 6b of the spindle. The other end surface 7b of sleeve 7 abuts the opposed spindle surface 6c as shown. This arrangement provides a thrust bearing between the stationary spindle 6 and rotating bit cone or cutter 5.

Figure 2:
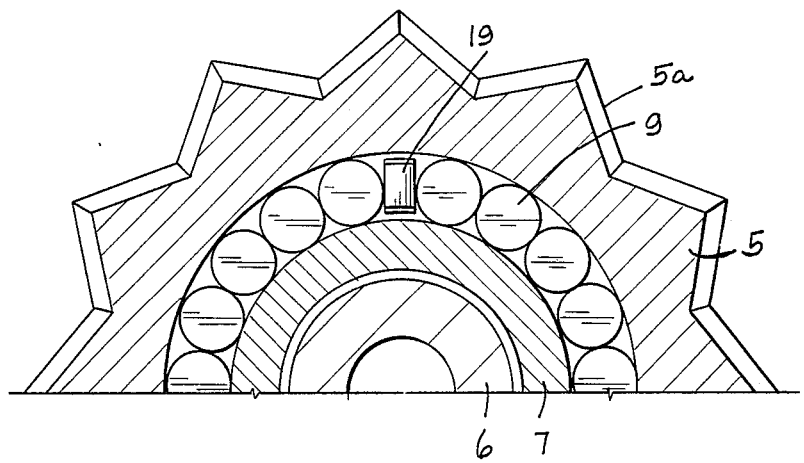
FIG. 2 is a sectional view on the line 2—2 of FIG. 1.

Suitable means are provided to accommodate rotation of the bit cone or cutter 5 relative to the spindle 6 and as illustrated in FIG. 2 of the drawings. Such means is in the form of roller bearings 8 which are received in suitable conformed surfaces 7e and 5b formed in sleeve and cutter, respectively. Any suitable means such as roller bearings, a journal bearing, ball bearings as shown or the like may be provided to accommodate the relative rotation between the bit cone 5 and the sleeve. It can be appreciated that the annular surfaces 5d and 7f on the cutter 5 and sleeve 7, respectively, can be of suitable configuration to accommodate whatever means are provided or employed to accommodate relative movement therebetween.

The sleeve 7 also is provided with a suitably contoured annular surface 7g for receiving rotatable means 9 thereon which are responsive to rotation of the rotatable member, or cutter 5 for propelling or driving the cage referred to generally at 10. The rotatabe means 9 may be in the form of roller bearings as shown, or in the form of ball bearing as well as tapered roller bearings, or any other suitable means to accommodate movement of the cage 10 in response to rotation of the cutter 5.

It can be appeciated that annular surface means 26 are provided on the rotatable member or cutter 5 for receiving the rotatable members or drive means 9, and again the surface 26 is suitably conformed to receive whatever means may be employed in lieu of the roller bearings 9.

The cage or cage assembly 10 includes a ring 11 that is defined by inner and outer circumferential edges 12 and 13, respectively. The inner and outer circumferential edge surfaces 12 and 13 are joined by the two side surfaces referred to generally at 14 and 15 extending therebetween.

Figure 3:
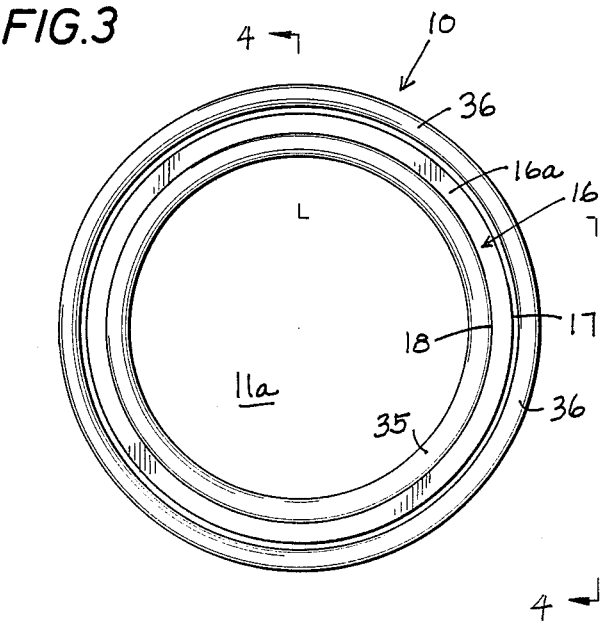
FIG. 3 is a front view of the cage of the present invention with the seal means in position thereon.

An annular projecting surfce referred to generally at 16 extends from one of said ring side surfaces, such as the side surface 14 as shown. Projecting surface 16 preferably extends longitudinally in relation to the longitudinal axis of ring 11. The annular projecting surface 16 is of less width or radial extent than side surface 14 to form annular edge surfaces 17 and 18 annular projecting surface 16, which edge surfaces are spaced by the width of the annular projecting end surface 16a as shown in FIGS. 3 and 4 of the drawings.

Inner and outer seal means or seal rings 35 and 36 are supported by the edge surfaces 18 and 17, on the projecting surface 16 along with the portion of the one side surface of ring 11 between surfaces 18 and 17 and the inner and outer edge 12 and 13, respectively as shown in the drawing.

Figure 4:
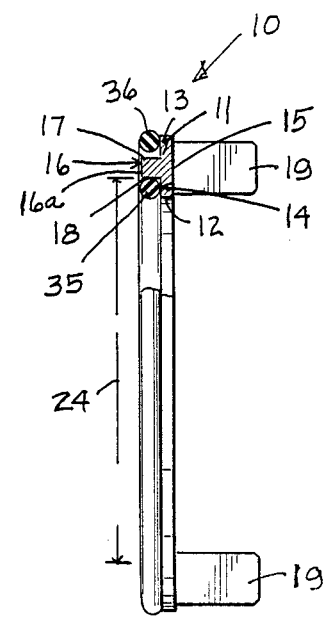
FIG. 4 is a sectional view on the line 4—4 of FIG. 3 partly in side elevation and illustrating an arrangement of the seals on the cage of the present invention.

It is desirable to effect a sealing arrangement, and thus the inner seal means or seal ring 35 should have an outer diameter not less than the inner diameter of surface 18 on ring 11, both diameters being represented at 24 in FIG. 4. Preferably, the outer diameter of the inner seal ring 35 is somewhat greater than the inner diameter of the surface 18 so that the inner seal ring 35 is compressed when in place on ring 11 to position the inner seal ring so that its inner circumference will overlay or overlap the inner circumferential edge 12 that defines the opening 11a in the ring 11.

Additionally, it is desirable that the outer seal ring 36 extend at least to the outer edge 13 of the ring 11 and preferably that it extend therebeyond. In the latter event, the inner diameter of the outer seal ring will be greater than the outer diameter of the annular projecting edge surface 17 and the outer diameter of seal ring 36 is greater than the diameter of outer edge 13 formed on the ring 11 so that the outer seal ring will overlap circumferentially the outer edge 13 of ring 11. The radial extend of ring 11 is less than the distance between surface 7g and 27. Also, the width or thickness of seal rings 35, 36 is such that the seals 35, 36 and not the outer edge of ring 11 or end surface 16a of annular projecting surface 16 engage the adjacent surfaces of the cutter or sleeve on the spindle.

In some instances, it may be desirable to have the diameter of the seal means or seal ring be substantially the same as the diameters of the projecting side surfaces 17 and 18 and provide seal bodies thick enough to accomplish the desired overlapping relationship with ring edges 12 and 13.

Thus, the seals 35, 36 overlap the inner and outer edges of ring 11 and the end 16a to sealably engage the cutter and the sleeve forming part of the spindle as the cage 11 rotates. The relationship between the motion of the cutter to the motion of the cage for each revolution of the cutter is substantially reduced in relation to the rotational speed of the cutter. This reduces the rotational speed between the cage assembly and 36 and also reduces the relative rotational speed between the seal 35 and the spindle 6 as compaed with what it would be if the cage of the present invention were not used. This substantially reduces seal wear while maintaining a seal.

Projection means referred to generally at 19 extend from the other side surface 15 for responding to rotation and movement of the rotatable member or cutter 5 and the roller bearings 9 or other suitable mans so as to impart rotation to the cage 10 and the seals supported thereby. The projection means 19 is in the form of at least one plate-like member extending from the other side surface 15 of ring 11 in a direction longitudinally opposite to the extension of the annular projecting suface 16 as shown in the drawings. As illustrated, two of such plate-like members 19 are shown being equidistant spaced on the ring 11. Any suitable member of projections may be employed on the ring 11 to properly distribute the load in response to movement of the members 9 to effect rotation of the cage 10.

The spindle includes a longitudinal passage 40 which has an annular groove 41 therein and a stop snap ring 42. A plug 44 closes off the other end of the passage, and a suitable grease fitting 46 is provided on the plug 43 that is sealably, but movably positioned in passage 40 whereby lubricant may be injected into the longitudinal passage portion 41a for providing lubricant to the bearings represented at 8 and the impelling means represented at 9.

The plug may move longitudinally in response t pressure in the well bore to equalize the pressure in the well bore and assist in maintaining the roller and ball bearings 19 and 15e lubricated.

The foregoing arrangement provides a simple and economical cage and seal arrangement which can be readily manufactured and placed in position. The outer edge 13 and end surface 16a on ring 11 are formed to be spaced from the surfaces adjacent the ring. That is the ring does not contact the sleeve 7 or cutter 5, as illustrated in the drawings. The seals are supported in sealing relationship to maintain an effective seal between the members 5 and 7. Also, the seal arrangement of this invention substantially reduces the relative rotational speed adjacent the sealing relationship between the stationary member and the inner seal 35 and thereby substantially increases the life of the sealing relationship defined by the cage and seals supported therewith.

The foregoing disclosure and description of the invention are illustrative and explanatory thereof, and various changes in size, shape and materials as well as in the details of the illustrated construction may be made without departing from the spirit of the invention.

What is claimed is:

1. In a cutter arrangement wherein a cutter is rotatably supported on the spindle of a cutter shank with radialy spaced seals between the cutter and the spindle, the invention comprising:
   a rotatable cage for supporting the radially spaced seals to seal between said rotatable cage and the rotatable cutter and to seal between said rotatable cage and the spindle, respectively, said cage including:
   a ring defined by inner and outer circumferential edges joined by two side surfaces extending between said edges;
   an annular projecting surface extending from one of said ring side surfaces between said ring inner and outer circumferential edges;
   projecting means extending from the other of said ring side surfaces; and rotatable means between the cutter and spindle and responsive to movement of said rotatable cutter for engaging said projecting means to rotate said rotatable cage.

2. The cutter arrangement of claim 1 wherein the projection means comprises a single projection extending from the other of said ring side surfaces.

3. The cutter arrangement of claim 1 wherein said projection means comprises a plurality of projections equally spaced about and extending from the other side of said ring side surfaces.

4. The cutter arrangement of claim 1 wherein said annular projecting surface is continuous with inner and outer annular circumferential surfaces thereon and wherein the radial extent of said annular projecting surface is less than the radial extent of said one side surface of said ring from which it extends.

5. The cutter arrangement of claim 4 wherein the seals are inner and outer annular seal means for supporting on said inner and outer annular circumferential surfaces, respectively, of said annular projecting surface and on said ring side surfaces that extend from said annular projecting surface to seal between said rotatable cage and rotatable cutter and to seal between said rotatable cage and the spindle.

6. The cutter arrangement of claim 4 wherein the outer diameter of said inner seal means is greater than the diameter of said inner annular circumferential surface of said annular projecting surface so that said inner seal circumferentially overlaps said inner circumferential edge of said ring.

7. The cutter arrangement of claim 4 wherein the inner diameter of said outer seal means is greater than the diameter of said outer annular circumferential surface of said annular projecting surface so that said outer seal circumferentially overlaps said outer circumferential edge of said ring.

8. In a rotatable seal arrangement for sealing between the rotatable seal arrangement and each of a pair of relatively rotatable members wherein one member rotates at a different rate from a second member, the invention comprising:
a rotatable cage for supporting the seals in radial spaced relationship to seal between said rotatable cage and the first member and to seal between said rotatable cage and the second member, respectively, said cage including:
a ring defined by inner and outer circumferential edges joined by two side surfaces extending between said edges;
an annular projecting surface extending from one of said ring side surfaces between said ring inner and outer circumferential edges;
projecting means extending from the other of said ring side surfaces; and
means for engaging said projection means to rotate said rotatable cage between the first and second member in response to rotation of at least one of said rotatable members.

9. The seal arrangement of claim 8 wherein said projection means comprises a single projetion extending from the other of said ring side surfaces.

10. The seal arrangement of claim 8 wherein said projection means comprises a plurality of projections equally spaced about and extending from the other side of said ring side surfaces.

11. The seal arrangement of claim 8 wherein said annular projecting surface is continuous with inner and outer annular circumferential surfaces thereon and wherein the radial extent of said annular projecting surface is less than the radial extent of said one side surface of said ring from which it extends.

12. The seal arrangement of claim 11 wherein the seals are inner and outer annular seal means for supporting on said inner and outer annular circumferential surfaces of said annular projecting surface and on said ring side surfaces that extend from said annular projecting surface to seal between said rotatable cage and rotatable cutter and to seal between said rotatable cage and the spindle.

13. The seal arrangement of claim 11 wherein the outer diameter of said inner seal means is greater than the diameter of said inner annular circumferential surface of said annular projecting surface so that said inner seal circumferentially overlaps said inner circumferential edge of said ring.

14. The seal arrangement of claim 11 wherein the inner diameter of said outer seal means is greater than the diameter of said outer annular circumferential surface of said annular projecting surface so that said outer seal circumferentially overlaps said outer circumferential edge of said ring.

15. A rotatable cage for supporting radially spaced seals to seal between relative movable members comprising:
a ring defined by inner and outer circumferential edges joined by two side surfaces extending between said edges;
an annular projecting surface extending from one of said ring side surfaces between said ring inner and outer circumferential edges;
projection means extending from the other of said ring side surfaces; and
means for engaging said projection means to rotate the rotatable cage between the members in response to rotation of at least one of said members whereby one of the radially spaced seals functions to seal between the rotatable cage and one of the relatively movable members, and the other radially spaced seal functions to seal between the rotatable cage and the other relatively moveable member.

16. The cage of claim 15 wherein said projection means comprises a single projection extending from the other of said ring side surfaces.

17. The cage of claim 15 wherein said projection means comprises a plurality of projections equally spaced about and extending from the other side of said ring side surfaces.

18. The cage of claim 15 wherein said annular projecting suface is continuous within inner and outer annular circumferential surfaces thereon and wherein the radial extent of said annular projecting surface is less than the radial extent of said one side surface of said ring.

19. The cage of claim 18 including inner and outer annular seal means for supporting on said inner and outer annular circumferential surfaces of said annular projecting surface.

20. The cage of claim 18 wherein the outer diameter of said inner seal means is greater than the diameter of said inner annular circumferential surface of said annular projecting surface so that said inner seal circumferentially overlaps said inner circumferential edge of said ring.

21. The cage of claim 15 wherein the inner diameter of said outer seal means is greater than the diameter of said outer annular circumferential surface of said annular projecting surface so that said outer seal circumferentially overlaps said outer circumferential edge of said ring.

22. The invention of claims 1, or 8, or 15 including inner and outer seal means on said ring and overlapping the inner and outer circumferential edges of said ring.

* * * * *